J. W. DICKSON.
CABLE HEAD.
APPLICATION FILED MAY 25, 1918.

1,305,591.

Patented June 3, 1919.

INVENTOR.
J. W. Dickson,
BY Hazard & Miller
ATTORNEYS

UNITED STATES PATENT OFFICE.

JOHN W. DICKSON, OF DALLAS, TEXAS.

CABLE-HEAD.

1,305,591.      Specification of Letters Patent.      Patented June 3, 1919.

Application filed May 25, 1918. Serial No. 236,643.

*To all whom it may concern:*

Be it known that I, JOHN W. DICKSON, a citizen of the United States, residing at Dallas, in the county of Dallas and State of Texas, have invented new and useful Improvements in Cable-Heads, of which the following is a specification.

My invention relates to cable heads and consists in the novel features herein shown, described and claimed.

Specifically, my object is to make an improved cable head for attaching a guy to a turnbuckle in aeroplane construction and the like.

Figure 1:
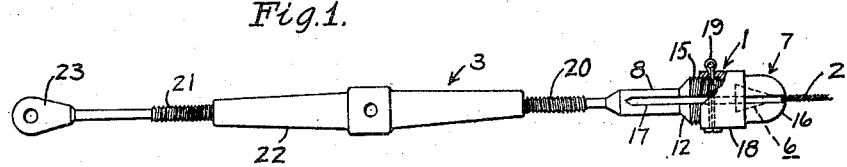
Figure 1 is an elevation showing a guy connected to a turnbuckle with a cable head embodying the principles of my invention.

The cable head 1 connects the guy 2 to the turnbuckle 3.

The guy 2 is a wire rope. The swage-ferrule 4 is funnel-shaped and the end of the guy 2 is inserted through the ferrule 4 from its small end and the ends of the wires are unwound and turned back upon themselves and then the large end of the ferrule is filled with solder 5, the solder filling the spaces around the wires and bonding with the wires and with the ferrule to make a solid head 6.

The cable head 1 comprises a main body 7 made of a single piece of metal, said body comprising a circular stem 8 having a circular bore 9, a shoulder 10 at the bottom of the bore, and a screw bearing 11 extending from the bore 9 past the shoulder 10, and a head 12 extending from the opposite end of the stem 8 from the bearing 11 and having a chamber 13 communicating with the bore 9, a tapered seat 14 extending from the chamber 13, an external screw-thread 15, and a hemispherical end face 16. A transverse slot 17 extends from the center of the end face 16 to near the bottom of the bore 9 so that the head 12 and the major portion of the stem 8 are divided into two equal parts and the two parts are sprung apart sufficiently to allow the head 6 upon the guy 2 to be inserted into the seat 14. Then the two parts are pressed together to grip the head 6. A sleeve 18 is screw-seated upon the thread 15 to hold the head in its gripping position, and a cotter 19 is inserted through the sleeve and through the head 12 just behind the head 6 to hold the parts together and to prevent rattling and unscrewing. The split end of the cotter is spread and hammered to hold the cotter firmly in place.

In Fig. 1 the head of the turnbuckle screw 20 is fixed in the bearing 11 by riveting, soldering, brazing, or the like, so as to make the screw 20 rigid with the cable head 1. The turnbuckle 3 consists of the screw 20, the screw 21, and the double-ended barrel 22, said screws 20 and 21 being one right-handed and the other left-handed so that when the head 23 of the screw 21 is attached to a rigid frame the barrel 22 may be rotated to tighten or loosen the tension of the guy 2.

Figure 2:
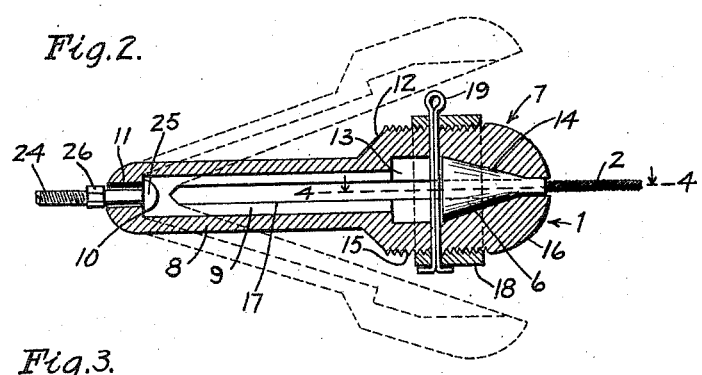
Fig. 2 is an enlarged sectional detail of the cable head on a plane parallel with Fig. 1, the guy and turnbuckle being broken away, the turnbuckle being modified.

In Fig. 2 the turnbuckle screw 24 is inserted point first through the bore 9 and bearing 11 until the head 25 engages the shoulder 10. Then the wrench seat 26 is fixed upon the screw as a means for rotating or swiveling the screw in the bearing 11. When this swiveled screw 24 is used in connection with the cable head a rigid barrel is provided to receive the screw.

Figure 3:
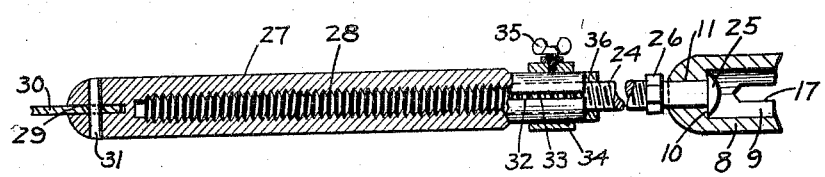
Fig. 3 is a fragmentary sectional detail showing the cable head connected to the modified form of turnbuckle shown in Fig. 2.

In Fig. 3 the barrel 27 is a piece of round rod having a screw-threaded bore 28 extending from one end, and a slot 29 in the other end to receive an ear 30 attached to a rigid frame, and a pin 31 is inserted transversely through the barrel and the ear. The open end of the barrel is reduced and provided with a transverse slot 32 to produce the yielding jaws 33. A clamping band 34 is placed upon the jaws 33 and a wing-headed set-screw 35 is inserted through the clamping band to engage one of the jaws 33 so that by manipulating the screw 35 the jaws 33 may be clamped together to pinch the screw and hold the screw from shaking in the bore and avoid a tendency to rattle or strip the thread. A lock-nut 36 is placed upon the screw 24 before the screw is inserted into the barrel and when the time comes to tighten the parts the lock-nut 36 is screwed tightly against the end of the barrel.

Figure 4:
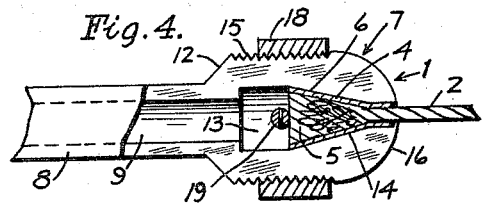
Fig. 4 is a fragmentary sectional detail on the line 4—4 of Fig. 2.

In the construction shown in Figs. 2 and 4 the guy 2 may be readily removed or replaced by removing the cotter 19, unscrewing the sleeve 18, and spreading the two parts of the head apart, and if desired the turnbuckle screw 24 may be removed by breaking the wrench seat 26, and a new screw inserted.

Thus I have produced a cable head and turnbuckle construction which provides a quick means for replacing either the guy or the turnbuckle screw and avoids the necessity of using complicated forms for attaching the guy.

The ends of the wire rope forming the guy are completely secured and covered with solder and the completed job is smooth and the liability of the wire rope being frayed or abraded is reduced to a minimum.

When desired the head 6 will swivel in the seat 14 and prevent all liability of twisting or untwisting the rope when manipulating the turnbuckle construction.

Various changes may be made without departing from the spirit of my invention as claimed.

I claim:

1. A cable head comprising a circular stem, a circular head extending from the stem; there being a central chamber in the head, a tapered seat extending one way from the central chamber, a bore extending the other way from the central chamber to near the outer end of the stem, and there being a shoulder at the bottom of the bore and a bearing opening passing the shoulder, and the head and stem being slotted longitudinally from the top of the head to near the shoulder so as to separate the head into two parts so that the two parts may be spread apart to receive a guy and tapered ferrule; a guy, a tapered ferrule secured to the end of the guy and fitting in the tapered seat, and means for holding the two parts together to grip the ferrule.

2. A cable head comprising a circular stem, a circular head extending from the stem; there being a central chamber in the head, a tapered seat extending one way from the central chamber, a bore extending the other way from the central chamber to near the outer end of the stem, and there being a shoulder at the bottom of the bore and a bearing opening passing the shoulder, and the head and stem being slotted longitudinally from the top of the head to near the shoulder, so as to separate the head into two parts so that the two parts may be spread apart to receive a guy and tapered ferrule; a guy, a tapered ferrule secured to the end of the guy and fitting in the tapered seat, a turnbuckle screw fitting in the bearing opening and having a head fitting the shoulder, a sleeve screw-seated upon the head to hold the two parts together to grip the ferrule, a pin inserted through the sleeve and through the head behind the ferrule to hold the ferrule in its seat, and a wrench seat upon the screw.

3. A cable head comprising a circular stem, a circular head extending from the stem; there being a central chamber in the head, a tapered seat extending one way from the central chamber, a bore extending the other way from the central chamber to near the outer end of the stem, and there being a shoulder at the bottom of the bore and a bearing opening passing the shoulder, and the head and stem being slotted longitudinally from the top of the head to near the shoulder so as to separate the head into two parts, so that the two parts may be spread apart to receive a guy and tapered ferrule; a guy, a tapered ferrule secured to the end of the guy and fitting in the tapered seat, a turnbuckle screw fitting in the bearing opening and having a head fitting the shoulder, a wrench seat upon the screw, and a sleeve screwed upon the head for holding the two parts of the head together.

In testimony whereof I have signed my name to this specification.

JOHN W. DICKSON.

Copies of this patent may be obtained for five cents each, by addressing the "Commissioner of Patents, Washington, D. C."